(12) United States Patent
La Fleur et al.

(10) Patent No.: US 10,074,214 B2
(45) Date of Patent: Sep. 11, 2018

(54) SYSTEMS AND METHODS FOR GENERATING 3D SCENES WITH TIME ELEMENT FOR DISPLAY

(71) Applicant: Autodesk, Inc., San Rafael, CA (US)

(72) Inventors: James Peter La Fleur, San Rafael, CA (US); Kimberly Whinna Cottrell, Pacifica, CA (US); Barbara Balents, Santa Barbara, CA (US); Todd Christopher Nicol, Warren, MI (US); George William Fitzmaurice, Toronto (CA); Luc Robert, Valbonne (FR); Emmanuel Gallo, South San Francisco, CA (US)

(73) Assignee: Autodesk, Inc., San Rafael, CA (US)

(*) Notice: Subject to any disclaimer, the term of this patent is extended or adjusted under 35 U.S.C. 154(b) by 13 days.

(21) Appl. No.: 15/390,369

(22) Filed: Dec. 23, 2016

(65) Prior Publication Data

US 2017/0193331 A1 Jul. 6, 2017

Related U.S. Application Data

(60) Provisional application No. 62/273,695, filed on Dec. 31, 2015.

(51) Int. Cl.
*G06K 9/68* (2006.01)
*G06T 17/00* (2006.01)
(Continued)

(52) U.S. Cl.
CPC .............. *G06T 17/00* (2013.01); *G01B 11/24* (2013.01); *G06K 9/00664* (2013.01);
(Continued)

(58) Field of Classification Search
CPC .................... G06T 17/00; G06T 7/593; G06T 2207/10021; G06T 7/13
(Continued)

(56) References Cited

U.S. PATENT DOCUMENTS 5,910,817 A * 6/1999 Ohashi ............... G06K 9/00208
340/903
6,411,742 B1 6/2002 Peterson
(Continued)

OTHER PUBLICATIONS

Hartley and Zisserman, "Multiple View Geometry in Computer Vision," Cambridge University Press, (2003) pp. 155-157, ISBN 0-521-54051-8.
(Continued)

*Primary Examiner* — Yosef Kassa
(74) *Attorney, Agent, or Firm* — Fish & Richardson P.C.

(57) ABSTRACT

Methods, systems, and apparatus, including medium-encoded computer program products, for generating and visualizing 3D scenes include, in one aspect, a method including: obtaining metadata for 2D images that are related to a location of interest; searching for discrete image correspondences between pairs of the 2D images; grouping the 2D images into different time periods, including inferring one or more time periods for a portion of the 2D images that do not have date metadata; receiving a selection of at least one of the different time periods; finding camera intrinsic and extrinsic parameters for each image grouped into the selected time period; reconstructing a 3D scene of the location during the selected time period from the 2D images grouped into the selected time period using the camera intrinsic and extrinsic parameters; and providing the 3D scene for use in displaying the location of interest from different 3D perspectives.

20 Claims, 6 Drawing Sheets

(51) Int. Cl.
*H04N 13/25* (2018.01)
*G06T 19/00* (2011.01)
*G01B 11/24* (2006.01)
*G06K 9/00* (2006.01)
*H04N 1/00* (2006.01)
*G06T 7/55* (2017.01)

(52) U.S. Cl.
CPC ............ *G06K 9/00671* (2013.01); *G06T 7/55* (2017.01); *G06T 19/006* (2013.01); *H04N 1/00* (2013.01); *H04N 13/25* (2018.05); *G06K 2209/40* (2013.01)

(58) Field of Classification Search
USPC ....... 382/103, 141, 154, 209, 218, 278, 291; 358/537, 538, 452
See application file for complete search history.

(56) References Cited

U.S. PATENT DOCUMENTS

| | | | | |
|---|---|---|---|---|
| 7,362,368 | B2* | 4/2008 | Steinberg | H04N 5/232 348/345 |
| 7,379,621 | B2* | 5/2008 | Aoki | G06T 5/50 345/629 |
| 7,428,007 | B2* | 9/2008 | Kitaguchi | H04N 5/23238 348/218.1 |
| 7,508,977 | B2* | 3/2009 | Lyons | G06F 3/04845 345/419 |
| 7,573,475 | B2 | 8/2009 | Sullivan et al. | |
| 7,595,826 | B2* | 9/2009 | Aoki | G06T 3/4007 348/237 |
| 7,995,861 | B2 | 8/2011 | Jin et al. | |
| 8,106,995 | B2* | 1/2012 | Tamaru | G02B 7/38 348/345 |
| 8,698,899 | B2* | 4/2014 | Nakamura | G06T 7/596 348/169 |
| 8,717,578 | B2* | 5/2014 | Ohnishi | G01B 11/245 356/600 |
| 8,732,125 | B2 | 5/2014 | Omansky et al. | |
| 8,878,840 | B2 | 11/2014 | Keough et al. | |
| 2010/0077316 | A1 | 3/2010 | Omansky et al. | |

OTHER PUBLICATIONS

"UV mapping," [online] [Retrieved on Aug. 5, 2015]; Retrieved from the Internet URL: https://en.wikipedia.org/wiki/UV_mapping; 3 pages.

"Camera resectioning," [online] [Retrieved on Aug. 5, 2015]; Retrieved from the Internet URL: https://en.wikipedia.org/wiki/Cameria_resectioning; 5 pages.

Triggs et al., "Bundle adjustment—a modern synthesis," In Vision algorithms: theory and practice, pp. 298-372, Springer Berlin Heidelberg, 2000.

Hiep et al., "Towards high-resolution large-scale multi-view stereo," In Computer Vision and Pattern Recognition, 2009, CVPR 2009, IEEE Conference on, pp. 1430-1437, IEEE, 2009.

Bay et al., "SURF: speeded up robust features," In Computer vision—ECCV 2006, pp. 404-417, Springer Berlin Heidelberg, 2006.

Ni et al., "GroupSAC: efficient consensus in the presence of groupings," In Computer Vision, 2009 IEEE 12th International Conference on, pp. 2193-2200, IEEE, 2009.

Quan and Triggs, "A unification of autocalibration methods," In Asian Conference on Computer Vision (ACCV'00), pp. 917-922, 2000.

Pollefeys et al., "Self-calibration and metric reconstruction in spite of varying and unknown intrinsic camera parameters," International Journal of Computer Vision, 18 pages (1998).

Ioannidis et al., "3D detailed reconstruction of a demolished building by using old photographs," International Archives of Photogrammetry and remote sensing, vol. XXXI, Part B5, pp. 16-21 (1996).

"3D models of old towns," [online] [Retrieved on May 7, 2015]; Retrieved from the Internet URL: https://photosynth.net/discussion.aspx?cat=a03647b9-821e-439b-8dbc-ae0239d6870d&dis=2478a39e-70a4-4291-b189-a586e2a457cd; 1 page.

"ReCap product news," [online] [Retrieved on May 7, 2015]; Retrieved from the Internet URL: http://www.recapproduct.com/blog/2014/08/; 16 pages.

Wu et al., "3D model matching with viewpoint-invariant patches (VIP)," [online] [Retrieved on Dec. 20, 2016]; Retrieved from the Internet URL: http://frahm.web.unc.edu/files/2014/01/3D-Model-Matching-with-Viewpoint-Invariant-Patches-VIP.pdf/; 8 pages.

* cited by examiner

SYSTEMS AND METHODS FOR GENERATING 3D SCENES WITH TIME ELEMENT FOR DISPLAY

CROSS-REFERENCE TO RELATED APPLICATIONS

This application claims the benefit under 35 U.S.C. § 119(e) of U.S. patent application No. 62/273,695, entitled "SYSTEMS AND METHODS FOR GENERATING 3D SCENES WITH TIME ELEMENT FOR DISPLAY", filed Dec. 31, 2015.

BACKGROUND

This specification relates to three dimensional (3D) modeling programs and rendering of 3D scenes.

Current technology allows for camera changing views within 3D scenes. A good example of this is a simple animation in a city or STREET VIEW® online software, available from Google Inc. of Mountain View, Calif., which displays geographic information, interactive geographic maps, and images of maps and mapped locations. The view is based upon fixed architecture, or in the case of some created 3D scenes, the imagination of whoever created the scene. For many visualizations, there exists no current scene, such as because a building or street has changed, been destroyed or has been significantly upgraded.

SUMMARY

This specification describes technologies relating to 3D modeling programs and visualizations of 3D scenes, including generating 3D scenes with a time element for display.

In general, one or more aspects of the subject matter described in this specification can be embodied in one or more methods that include: obtaining metadata for two dimensional (2D) images from different sources, wherein the images are related to a location of interest; searching for discrete image correspondences between pairs of the 2D images; grouping the 2D images into different time periods, wherein the grouping includes inferring one or more time periods for a portion of the 2D images that do not have date metadata based on a number of discrete image correspondences found between the portion of the 2D images that do not have date metadata and one or more of the 2D images that do have date metadata; receiving a selection of at least one of the different time periods; finding camera intrinsic and extrinsic parameters for each image grouped into the selected time period; reconstructing a three dimensional (3D) scene of the location of interest during the selected time period from the 2D images grouped into the selected time period using the camera intrinsic and extrinsic parameters; and providing the 3D scene for use in displaying, on one or more computer output devices, the location of interest from different 3D perspectives. These and other embodiments can optionally include one or more of the following features.

A bundle adjustment technique can be used to refine position and orientation information in the camera intrinsic and extrinsic parameters. Incorrect date metadata can be identified for at least one of the images based on a lack of discrete image correspondences found between the at least one of the images and other ones of the images that have date metadata. Further, the reconstructing can include: extracting a dense point cloud, from the 2D images grouped into the selected time period, using a plane sweeping algorithm; computing a coarse mesh from the point cloud; refining the coarse mesh on the 2D images grouped into the selected time period to form the mesh of the 3D scene; and computing an UV atlas of the mesh and creating texture for the 3D scene.

The method can include retrieving the 2D images from the different sources including one or more servers hosting scanned print references, video feeds, social media sites, and one or more users, and the obtaining can include extracting metadata from at least a portion of the retrieved 2D images. The method can include associating different subsets of the metadata with different points of view in the 3D scene. In addition, receiving the selection can include receiving selection of two or more of the different time periods, the finding and the reconstructing can be performed for each of the two or more of the different time periods, and the providing can include providing two or more 3D scenes of the location of interest at two or more different times, wherein the two or more 3D scenes support animation of the location of interest on the one or more computer output devices, the animation showing movement in both space and time.

The searching can include employing user input regarding one or more common features in the 2D images and one or more regions in the 2D images that have changed over time. The searching can include: finding at least two sets of the 2D images that share corresponding sets of discrete image correspondences; presenting to a user at least one image from each of the at least two sets; receiving from the user selections of a first region of interest that is common across the presented images and a second region of interest that has changed across the presented images; and rechecking for discrete image correspondences between pairs of the 2D images using the first region of interest and the second region of interest. Moreover, the grouping can include separating the 2D images into the different time periods based on a number of discrete image correspondences found in the second region of interest in relation to a number of discrete image correspondences found in the first region of interest.

One or more aspects of the subject matter described in this specification can also be embodied in one or more systems that include: a computer network; and one or more computing devices coupled with the computer network and programed to (i) obtain metadata for two dimensional (2D) images from different sources in the computer network, wherein the images are related to a location of interest, (ii) search for discrete image correspondences between pairs of the 2D images, (iii) group the 2D images into different time periods, including inferring one or more time periods for a portion of the 2D images that do not have date metadata based on a number of discrete image correspondences found between the portion of the 2D images that do not have date metadata and one or more of the 2D images that do have date metadata, (iv) receive a selection of at least one of the different time periods, (v) find camera intrinsic and extrinsic parameters for each image grouped into the selected time period, (vi) reconstruct a three dimensional (3D) scene of the location of interest during the selected time period from the 2D images grouped into the selected time period using the camera intrinsic and extrinsic parameters, and (vii) display the location of interest from different 3D perspectives in the 3D scene. These and other embodiments can optionally include one or more of the following features.

The one or more computing devices can be programmed to use a bundle adjustment technique to refine position and orientation information in the camera intrinsic and extrinsic parameters. The one or more computing devices can be programmed to identify incorrect date metadata for at least one of the images based on a lack of discrete image correspondences found between the at least one of the images and other ones of the images that have date metadata. The one or more computing devices can be programmed to extract a dense point cloud using a plane sweeping algorithm, compute a coarse mesh from the point cloud, refine the coarse mesh on the 2D images grouped into the selected time period to form the mesh of the 3D scene, and compute an UV atlas of the mesh and create texture for the 3D scene.

The one or more computing devices can be programmed to retrieve the 2D images from the different sources including one or more servers hosting scanned print references, video feeds, social media sites, and one or more users, and the one or more computing devices are programmed to extract metadata from at least a portion of the retrieved 2D images. The one or more computing devices can be programmed to associate different subsets of the metadata with different points of view in the 3D scene. The one or more computing devices can be programmed to reconstruct a 3D scene for each of two or more selected time periods, and animate of the location of interest in both space and time using the reconstructed 3D scenes.

The one or more computing devices can be programmed to employ user input regarding one or more common features in the 2D images and one or more regions in the 2D images that have changed over time. The one or more computing devices can be programmed to find at least two sets of the 2D images that share corresponding sets of discrete image correspondences, present to a user at least one image from each of the at least two sets, receive from the user selections of a first region of interest that is common across the presented images and a second region of interest that has changed across the presented images, and recheck for discrete image correspondences between pairs of the 2D images using the first region of interest and the second region of interest. The one or more computing devices can be programmed to separate the 2D images into the different time periods based on a number of discrete image correspondences found in the second region of interest in relation to a number of discrete image correspondences found in the first region of interest.

Particular embodiments of the subject matter described in this specification can be implemented to realize one or more of the following advantages. Two dimensional (2D) images from different sources and timeframes can be combined to generate a 3D model. This can enable visualization of a particular scene (e.g., a building, monument, area of a city, etc.) in 3D at any particular time. For example, the 3D visualization can include animated movement in the 3D space of the model, separate from or in combination with, movement in time, where the rendered scene can be changed based on different historical source images of the location. In addition, the source images need not be limited to actual photographs of a physical site, but rather can also include paintings or other artists' illustrations showing a location of interest. Thus, a digital scene can be created using different image sources that span many time periods, and this 3D digital world can then be explored by users, both in 3D space and in the fourth dimension of time. This can have significant value in various endeavors and products, including interactive text books, historical review, detective work, and construction timelines (e.g., construction site monitoring for management, e.g., of building construction).

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
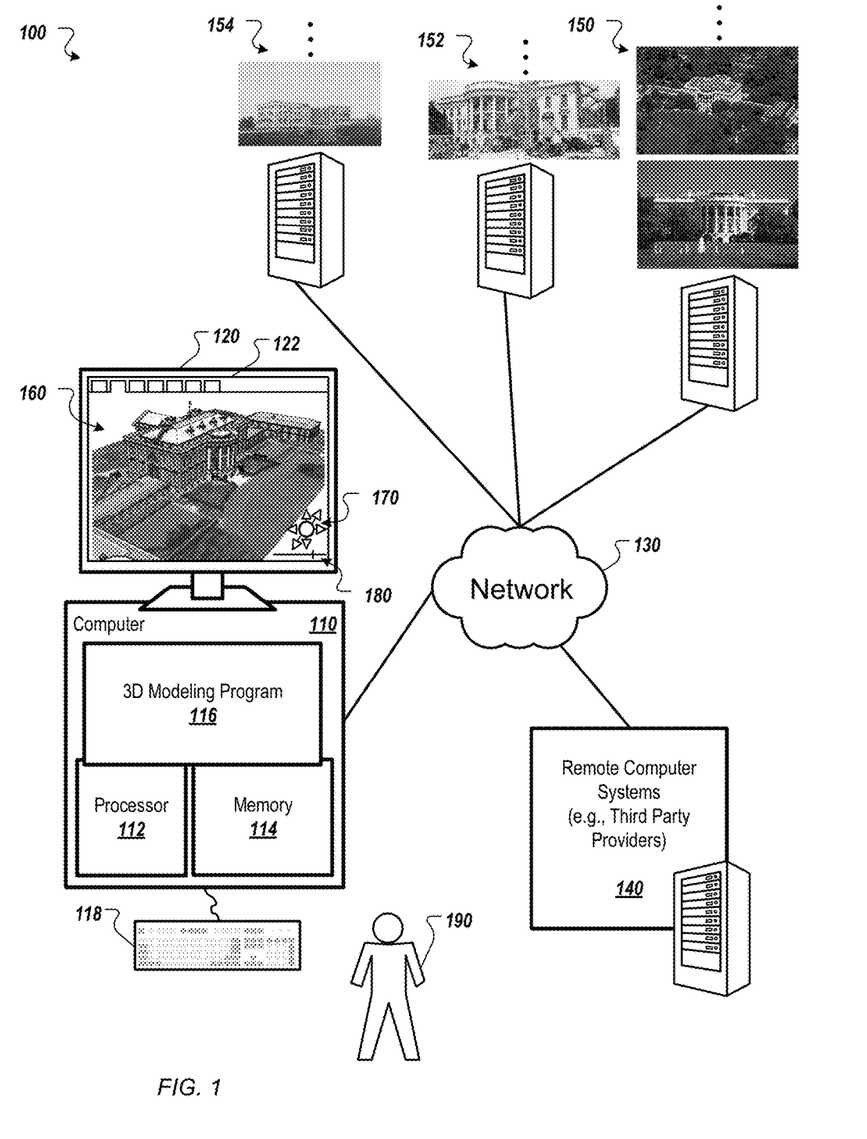
FIG. 1 shows an example of a system usable to generate, display and animate three dimensional (3D) scenes from two dimensional (2D) source images.

FIG. 1 shows an example of a system 100 usable to generate, display and animate three dimensional (3D) scenes from two dimensional (2D) source images. A computer 110 includes a processor 112 and a memory 114, and the computer 110 can be connected to a computer network 130, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs can include a 3D modeling program 116, which can run locally on computer 110, remotely on a computer of one or more remote computer systems 140 (e.g., in a third party provider's server system accessible by the computer 110 via the network 130), or on a combination of one or more of each of the preceding. The 3D modeling program 116 presents a user interface (UI) 122 on a display device 120 of the computer 110, which can be operated using one or more input devices 118 of the computer 110 (e.g., keyboard and mouse or touch screen). Note that while shown as separate devices in FIG. 1, the display device 120 and/or input devices 118 can also be integrated with each other and/or with the computer 110, such as in a tablet computer.

The 3D modeling program 116 is programmed to generate and visualize 3D scenes using 2D images. The 3D modeling program 116 can employ known systems and techniques for generating a 3D scene from a single image. In addition, the 3D modeling program 116 can be programmed to pull 2D images from many sources and combine them into a single visualization of a 3D scene, where that single 3D visualization includes a time element.

For example, different sets of images 150, 152, 154 can be retrieved from different sources over the network 130. These different sets of images 150, 152, 154 can have very different characteristics, but in general, they can be filtered such that each image contains (or at least is suspected to contain) at least a portion of a location of interest. In the example shown, the location of interest is the US White House, but many different locations can be used, including indoor locations. Thus, the word "location" can mean the location of an object of interest (e.g., an artifact in a museum) rather than a physical location on Earth.

The different sources can include various servers that host (or point to, e.g., in search results) print references (e.g., books, magazines, flyers, other print media; most of these sources have been digitized), video feeds (e.g., closed circuit TV), and social media sites (e.g., FACEBOOK, TWITTER, INSTAGRAM). Note that millions and millions of images taken from particular locations are available on the Internet. Further, in some implementations, users can be a source of the input images, where the 3D modeling program can include in its UI 122 various UI elements that allow a user 190 to select input images for the process, either from the network 130 or from the local computer 110 (or directly attached devices, such as a smart phone).

In addition, in some implementations, the different sets of images 150, 152, 154 can include 3D images in addition to 2D images. Such 3D images can be generated using various 3D sensing devices, such as LIDAR (Light Detection And Ranging) cameras and structured light 3D cameras (e.g., the PRIMESENSE™ Kinect camera (available from Microsoft Corporation of Redmond, Wash.). Further, such 3D images can be generated programmatically, such as 3D models generated using CAD (Computer Aided Design) software.

Because of the variation in the sources of the images, the images in the different sets of images 150, 152, 154 will have different metadata, including some images with no metadata at all. Nonetheless, for many of the images, metadata is available, and this metadata will often include any information captured with the images, such as focal length, exposure, and GPS (Global Positing System) location. Note that such information is captured by typical smart phone cameras today. However, many of the images will not have this type of information. For example, the images 150 may have such associated information, but neither an old photograph 152 nor a scanned image 154 of a painting (showing the White House being reconstructed after the War of 1812, when it was partially destroyed) may have such associated information, or the associated information may be inaccurate. For example, if the image 154 is a photograph of the painting taken by a smart phone, the camera information included in the image 154 by the smart phone will not reflect the image details of the actual scene. Likewise, some images may have incorrect perspectives (e.g., a photo of a photo) which can be corrected by preprocessing (e.g., automated rectification or with user input) to remove deformation of the location of interest in the image.

For some of the images, metadata can be generated from the information found in association with the image or from the image itself. For example, some metadata can be generated for an image based on other information (e.g., date information) found on the Web page in proximity to the image. As another example, self-calibration can be performed on a photo to find focal length directly, such as by using the systems and methods described in Pollefeys et al., "Self-Calibration and Metric Reconstruction in spite of Varying and Unknown Intrinsic Camera Parameters", International Journal of Computer Vision 1998, the systems and techniques described in Quan et al., "A Unification of AutocalibrationMethods", Asian Conference on Computer Vision (ACCV) 2000, or a combination of these. For some of the images, this information can be inferred based on the metadata available for other similar images. Thus, using the systems and method described herein, images from different sources (and having different properties) can be combined to create a 3D scene. While this process can be resource intensive, it can be achieved, such as using the expanded computing capabilities of the computing cloud or other massive data processing systems.

It is reasonable to create a particular viewpoint at any place on Earth based on a single image. With the given information associated with that image (e.g., GPS) it can be placed properly in a location. From the location, a particular view, viewport, or focal angle can be computed. From this basic information, more image data can be placed using the initial location and computing the adjacent or close by locations. There are many sources of images that may be available to construct a view with a given viewport.

In addition, the 3D modeling program 116 can be designed to determine differences in time periods for the input images, and group them according to time period, allowing the user 190 to display a digital 3D scene 160, where different times (e.g., month, year, decade, century) for the scene can be selected. In some implementations, images from different illustrations or recreations of historically accurate buildings (or other historical items) can be included in the source images, and the user 190 can use the 3D modeling program 116 to view a particular location (e.g., a specific avenue in a specific city) at a particular point in history. In addition, the UI 122 can include a UI element 170 that allows the user 190 to rotate and translate the view into the 3D space, thus displaying the 3D reconstruction of the location from many different points of view (camera view location plus camera view angle).

Different viewpoints/camera angles can be generated using the 3D model constructed from the 2D images, and any given view shown to the user can include texturing on the 3D model that either comes from the one 2D image that has the best image data for a given part of the 3D model or comes from a melding of several images together (slightly different coloring) in a manner similar to "morph" technology. Such 3D camera viewing technology and morphing technology can be leveraged to move between different data sources. In addition, in some implementations, known techniques can be used to clean up and/or meld/stitch the images together to create new data sets for the generated 3D model. Using such techniques, entirely new points of view (i.e., that did not previously exist in any of the source 2D images) can be created and displayed 160.

In addition, the UI 122 can include another UI element 180 that allows the user 190 to move through the time axis of the 3D scene generated from the source images. In some implementations, the UI elements 170 & 180 are combined. Further, in some implementations, the 3D modeling program 116 is programmed to create animations of movement in the 3D scene 160, which can include both movement in the 3D space and movement in time, where the textures placed on the 3D model of the location can be blended together for the transition from one time period to another. In some implementations, the 3D modeling program 116 is designed to let the user 190 specify paths in 3D space and time transitions, from which the 3D modeling program 116 can then generate an animation.

Figure 2:
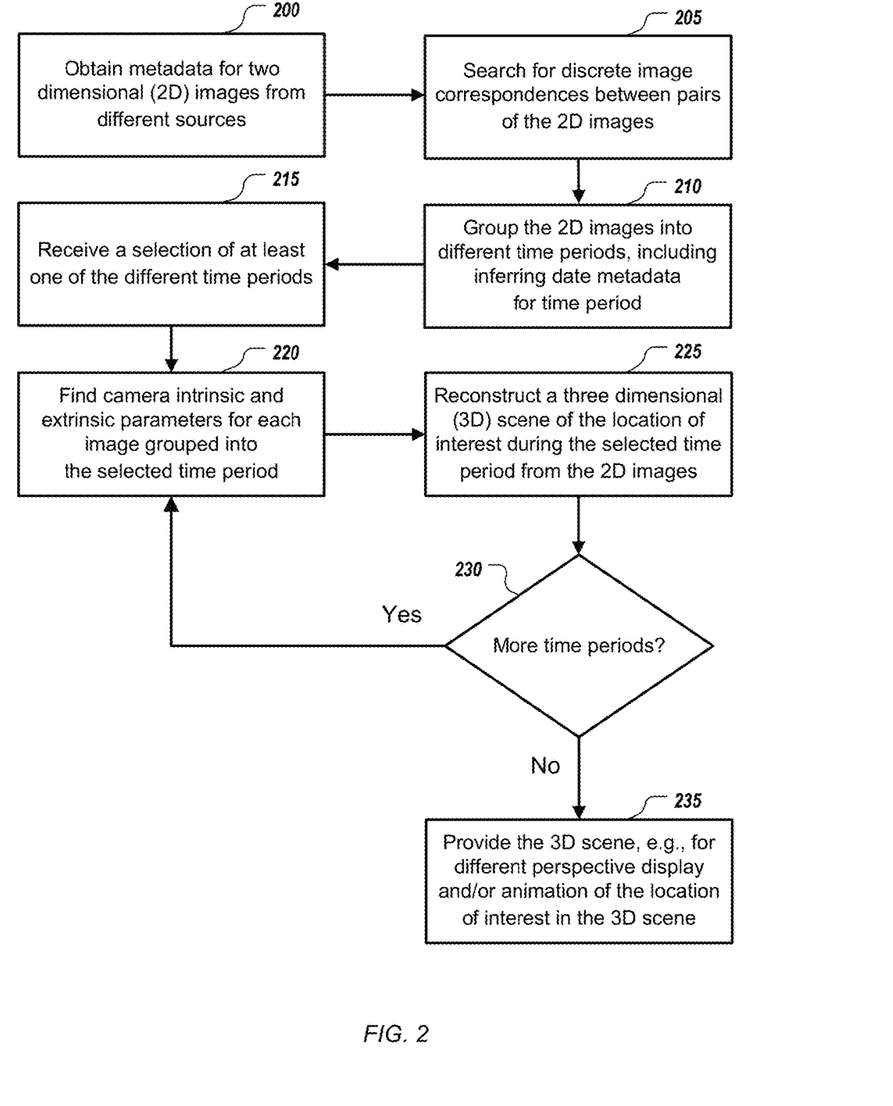
FIG. 2 shows an example of a process of creating a 3D scene from 2D source images.

FIG. 2 shows an example of a process of creating a 3D scene from 2D source images. Metadata for 2D images from different sources are obtained 200. The metadata can be existing metadata, which can be extracted from the images themselves, and/or the metadata can be new metadata created for images from information associated with the images. The 2D images are related to a location of interest (e.g., as specified by a user) can be provided as input to the process, or the obtaining 200 can include retrieving images (e.g., from the Internet) and identifying a subset of the retrieved images that likely include the location of interest.

A search 205 for discrete image correspondences between pairs of the 2D images is performed. In some implementations, this involves searching all pairs of the source 2D images. In some implementations, the pairings are limited to respective groups of the source 2D images, such as groups based on image source and/or image type, or groups based on initial image classifications (e.g., likely time periods for the images). In some implementations, the search 205 can involve known systems and methods for detecting interest points in images, comparing descriptors for these interest point between images and matching descriptors to find corresponding points between a pair of images, such as described in Herbert Bay, Andreas Ess, Tinne Tuytelaars, Luc Van Gool "SURF: Speeded Up Robust Features", Computer Vision and Image Understanding (CVIU), Vol. 110, No. 3, pp. 346-359, 2008, and Ni, K.; Jin, H. & Dellaert, F. (2009), GroupSAC: Efficient consensus in the presence of groupings., in 'ICCV', IEEE, pp. 2193-2200).

Further, in some implementations, 3D images can also be used as inputs, as noted above. In such implementations, registration of two 3D images with each other can be done through at least three common points between the two images. These common points can be identified manually, or extracted automatically (e.g., using salient points such as corners, using the systems and methods described in Wu et al., "3D model matching with Viewpoint-Invariant Patches (VIP)", Computer Vision and Pattern Recognition, 2008, or using 3D SIFT, and matching using local descriptors, e.g. SHOT, Spin Image, etc.). Thus, the processing for 3D images can be similar to that used for 2D images, with different feature extractors and local descriptors that use 3D shape. Moreover, in some implementations, additional types of data can be used as inputs, including potentially preexisting 3D models.

The 2D images (and potentially 3D images) are grouped 210 into different time periods. This can involve inferring information for a portion of the 2D images based a number of discrete image correspondences. For example, a 2D image with no metadata can have metadata generated for it based on the metadata associated with other images that are found to be similar based on a large number of identified discrete image correspondences. Other factors can also be employed to infer information (e.g., date and camera properties metadata) about source 2D images. In some implementations, one or more time periods are inferred 210 for a portion of the 2D images that do not have date metadata based on a number of discrete image correspondences found between the portion of the 2D images that do not have date metadata and one or more of the 2D images that do have date metadata.

A selection of at least one of the different time periods can be received 215. Note that this selection need not occur immediately after the grouping 210, and in some implementations, the selection 215 occurs at different points in the process. In some implementations, the user can specify the different time periods in advance, and the obtaining 200, searching 205 and grouping 210 can be performed based on this input. For example, the user may specify the Bastille in France as the location of interest, a starting year, and a date range of 50 years for the time periods, and the system can then automatically retrieve images of the Bastille (including both photos and artists' illustrations), initially place each image into one (or more) of multiple 50 year time periods, and then do image comparisons to find similarities, infer metadata and regroup the images, as needed.

Camera intrinsic and extrinsic parameters can be found 220 for each image grouped into a selected time period. Such parameters can be found in metadata for an image, by reconstruction from image data, by inference from similarities with other images, or a combination of these. Moreover, in some implementations, the camera intrinsic and extrinsic parameters can be found 220 for all the images in each respective identified time period. For example, in some implementations, all the input images are processed to generate a 3D scene that includes different 3D models (and different source images for texturing the 3D models) for different time periods, and the selection 215 can occur at the end of the process, such as when the user interacts with the user interface to specify a visualization to show how the 3D scene changes over time.

A 3D scene of the location of interest during the selected time period is reconstructed 225 from the 2D images grouped into the selected time period using the camera intrinsic and extrinsic parameters. This involves generating a 3D model, including textures for the 3D model, from the 2D images using known systems and method. In addition, further details regarding various implementations of the reconstruction process are described below, and in situations where a 3D reconstruction cannot be generated, a fallback method can involve displaying 2D images in 3D space with correct X,Y,Z coordinates on the location. Regardless of the details of the 3D reconstruction techniques, while more time periods remain 230 (e.g., all available time periods or user selected time periods), the process continues with finding 220 camera parameters and reconstructing 225 3D models to generate a 3D scene that spans different time periods. Note further that, in some implementations, one or more future time periods can also be used, such as by using source images and data from a planned renovation of a structure or area (e.g., for urban planning applications), and so the 3D experience that is generated can include future time periods.

In addition, while the example of FIG. 2 focuses on validating an image with respect to time, other image validation operations can also be performed as part of a process of creating a 3D scene. For example, some part of a scene may have changed (e.g., been destroyed) while another part of the scene has not, and both parts of the scene may appear in the same image. In some implementations, for each image, a set of masks (which can be generated manually or automatically) can be used to identify areas corresponding to different time spans. Each mask can have a time interval attached to it, and retrieving images relevant to a given date can involve retrieving any image for which there is at least a mask whose time interval includes that date. This approach can be applied to 3D input images as well. In addition, in some implementations, existing structures can be obfuscated or hidden in a rendering when those structures are not accounted for in historical images and scenes.

In any case, the complete 3D scene (e.g., two or more 3D scenes of the location of interest at two or more different times) can then be provided 235 for use in displaying (on one or more computer output devices) the location of interest from different 3D perspectives. Further, as noted above, the 3D scene can also be used to generate animations of movement around and through the 3D space of the 3D model of the object of interest, as well as movements in time, where the rendered 3D model changes over time. Thus, the generated 3D scene(s) can support animation of the location of interest on the one or more computer output devices, where the animation can show changes in both space and time. Thus, a time-lapse type video of the 3D scene over time can be generated, in which the evolution of the location is shown over potentially multiple time periods and over more than one model of the changing structures of the 3D scene.

Figure 3A:
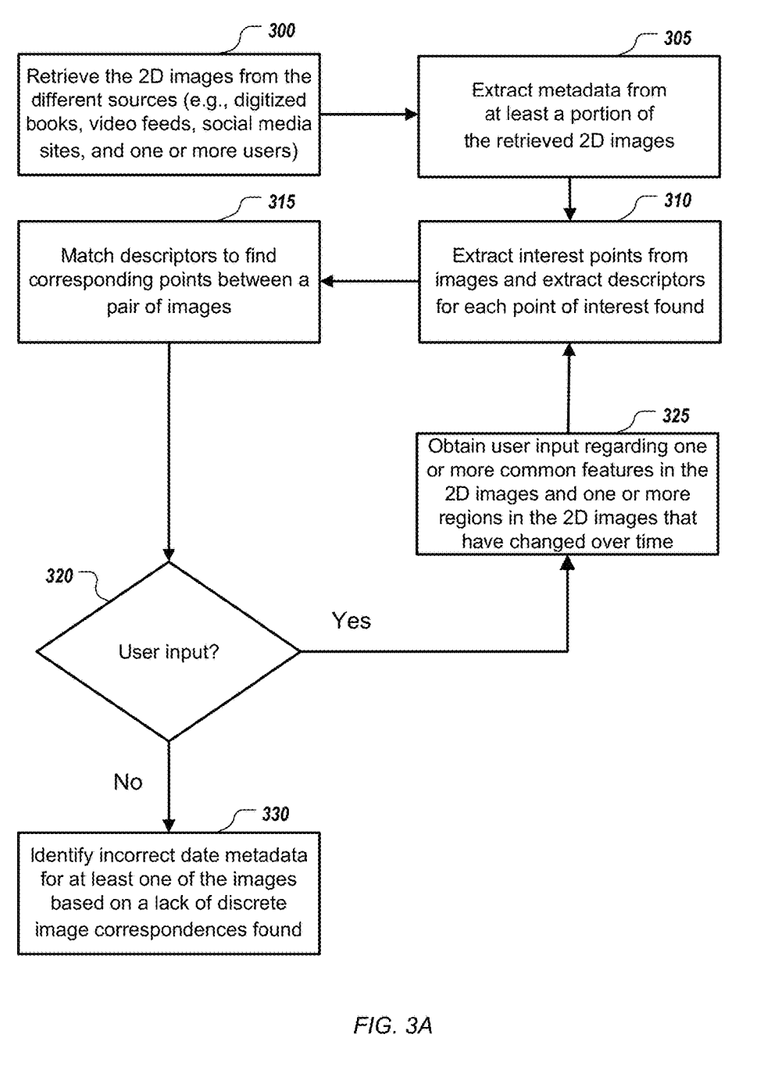
FIG. 3A shows an example of a process of retrieving and matching 2D images.

FIG. 3A shows an example of a process of retrieving and matching 2D images. The 2D images are retrieved 300 from different sources. For example, the 2D images can be retrieved from servers hosting scanned print references, video feeds, social media sites, and from one or more users (e.g., crowd sourcing the images). Metadata can be extracted 305 from at least a portion of the retrieved 2D images. This metadata can include date, GPS location, camera parameters, or a combination of these.

Interest points can be extracted 310 from images and descriptors can be extracted 310 for each point of interest found. For example, some implementations can use the systems and methods described in Herbert Bay, Andreas Ess, Tinne Tuytelaars, Luc Van Gool "SURF: Speeded Up Robust Features", Computer Vision and Image Understanding (CVIU), Vol. 110, No. 3, pp. 346-359, 2008. Further, descriptors can be matched 315 to find corresponding points between a pair of images. For example, some implementations can use the systems and methods described in Ni, K.; Jin, H. & Dellaert, F. (2009), GroupSAC: Efficient consensus in the presence of groupings., in 'ICCV', IEEE, pp. 2193-2200).

A check 320 can be made to determine if user input is desirable. In some implementations, user input is always sought. In some implementations, a determination is made as to whether the identified matches between images is sufficient to proceed, and if not, input can be obtained from a user to facilitate matching images and identifying correct time periods for images. In some implementations, user input is obtained 325 regarding one or more common features in the 2D images and one or more regions in the 2D images that have changed over time. This information can then be used to facilitate matching of descriptors to find corresponding points between images, as described in further detail below. Moreover, in some implementations, the images from one time period can be used to complete or infer structural information from a different time period, and the user interface can be used to show inferred structures using a different color or texture to get user input before rendering the inferred structure using the same visual rendering style as the target time period.

In addition, once the images have been properly grouped, incorrect metadata (e.g., date metadata) can be identified 330 for at least one of the images based on a lack of discrete image correspondences found between the at least one of the images and other ones of the images that have corresponding metadata. For example, an image may have an assigned date that comes from the copyright of the book from which the image was scanned, but comparisons of the image with other images can show that the image is from a much earlier time, and so the date from the book is not applicable to image found therein. For date and time verification, confidence values can be associated with each date and/or time period depending upon the source from which it comes. For example, a date found in EXIF (Exchangeable Image File) metadata may be more likely trusted that a date found in a website, but the period of time around this date may be less trusted.

In some implementations, such confidence values can be adjusted depending upon whether the features in the images match the other images with the same date and/or time period, and the confidence values can be used to reject or accept an image for a specific date and/or time period. For example, if a first image has EXIF data indicating it comes from the year 1960, the image should be trusted with a certain confidence for 1960, but less trusted for 1959 or 1961. However, if this first image matches a second image that was taken in 1961, the confidence level for the first image can be increased with respect to its being trusted for the period 1960 to 1961, but less trusted for 1959 or 1962.

Figure 3B:
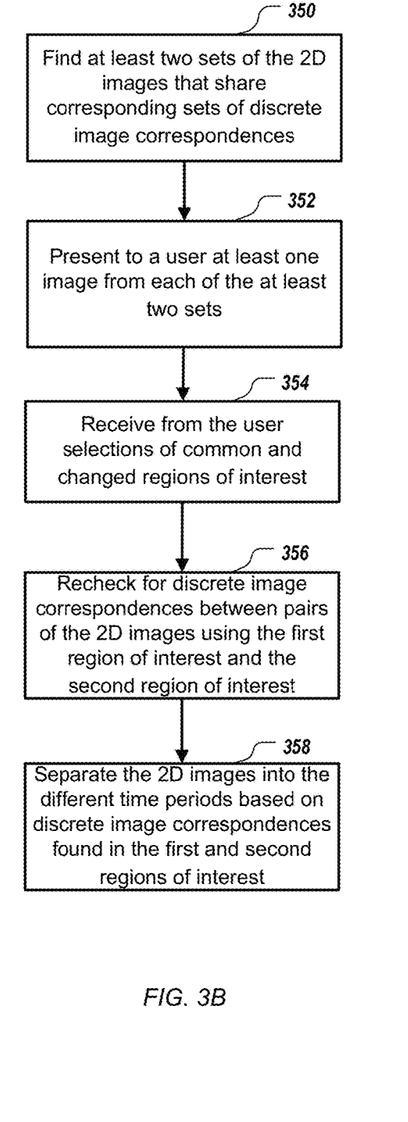
FIGS. 3B-3C show additional examples of processes of retrieving and matching 2D images.
Figure 3C:
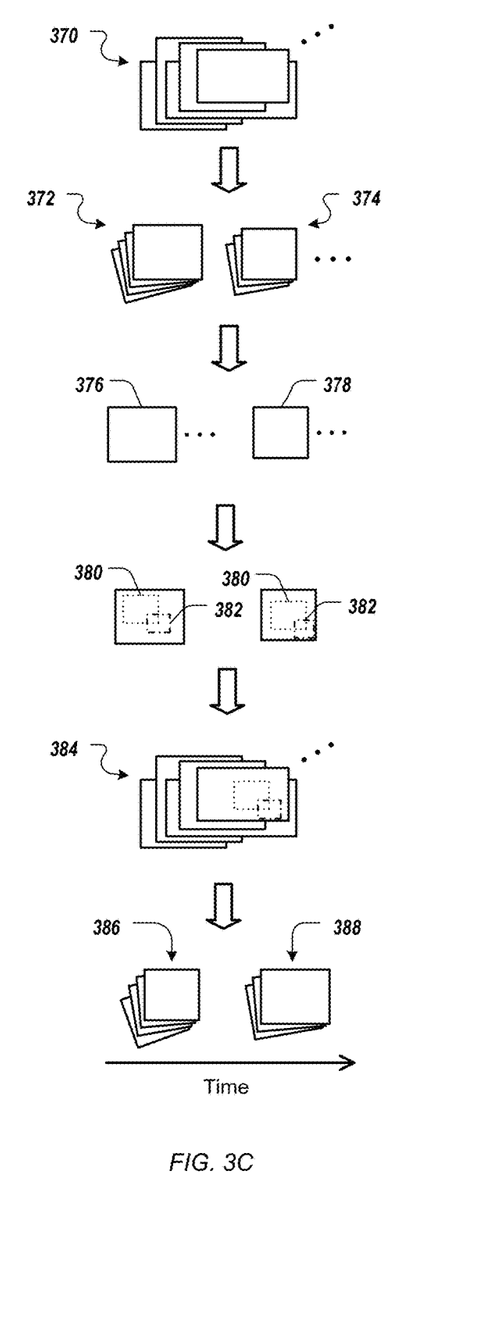

FIGS. 3B-3C show additional examples of processes of retrieving and matching 2D images. At least two sets of 2D images that share corresponding sets of discrete image correspondences are found 350. For example, an initial set of images 370 can be compared and divided into two or more sets of images 372, 374 based on the images having a threshold number of discrete image correspondences between each pair of images in the set. Note that each set of images can include images that have been found similar even though they come from different time periods.

At least one image 376, 378 from each of the at least two sets 372, 374 can be presented 352 to a user. In some implementations, a single representative image from each set is presented to the user (e.g., the image from each set having the greatest field of view of images in that set). In other implementations, more than one image from each set can be presented to the user, and the user interface can allow the user to view the images and select a representative image for each set. Further, in some implementations, the user interface can enable the user to make changes to the image sets themselves, such as by presenting images of the sets side by side and allowing a user to move images from one set to another set, allowing a user to remove images from all sets entirely, or a combination of these.

In any case, selections are received 354 from the user, where the selections can include selection of a first region of interest that is common across the presented images and a second region of interest that has changed across the presented images. For example, for each representative image presented, the user can specify a first region 380 in which key features of the location of interest can be found (e.g., the portion of a city block in which a building of interest can be seen), and the user can specify a second region 382 in which key features of the location have changed (e.g., a portion of the building that has been rebuilt). The two regions 380, 382 can be separate, can overlap, or one can fully contain the other. The two regions 380, 382 can be specified in more than one representative image from each image set, and the two regions 380, 382 can be different shapes and sizes in different images. In the example shown, the two regions 380, 382 are sown as rectangles (e.g., drawn by the user with a bounding box tool) but other shapes are possible, and such regions can be specified with known image editing user interface tools.

With the user specified information provided, the images 384 can be rechecked 356 for discrete image correspondences between pairs of the 2D images. Using the first region of interest, the amount of image data that needs to be processed to find similar images can be reduced. Moreover, using the second region of interest, images that are similar because of the time frame in which they show the object of interest can be more readily identified. For example, the 2D images can be separated 358 into the different time periods based on a number of discrete image correspondences found in the second region of interest in relation to a number of discrete image correspondences found in the first region of interest. Note that the threshold number of discrete image correspondences that are needed to identify a match can be changed when processing based on the first region and the second region. Moreover, the images that belong to each set can be changed based on this processing, resulting in final image sets 386, 388 that have been located with respect to a timeline and are ready for use in 3D reconstruction.

Reconstruction of 3D scenes can be done using known systems and methods. For example, some implementations use the systems and methods described in Vu, H-H. and Keriven, R. and Labatut, P. and Pons, J.-P Towards high-resolution large-scale multi-view stereo. Conference on Computer Vision and Pattern Recognition (CVPR), Miami, June 2009. Such systems and methods can be employed in combination with the systems and methods described herein.

Figure 4:
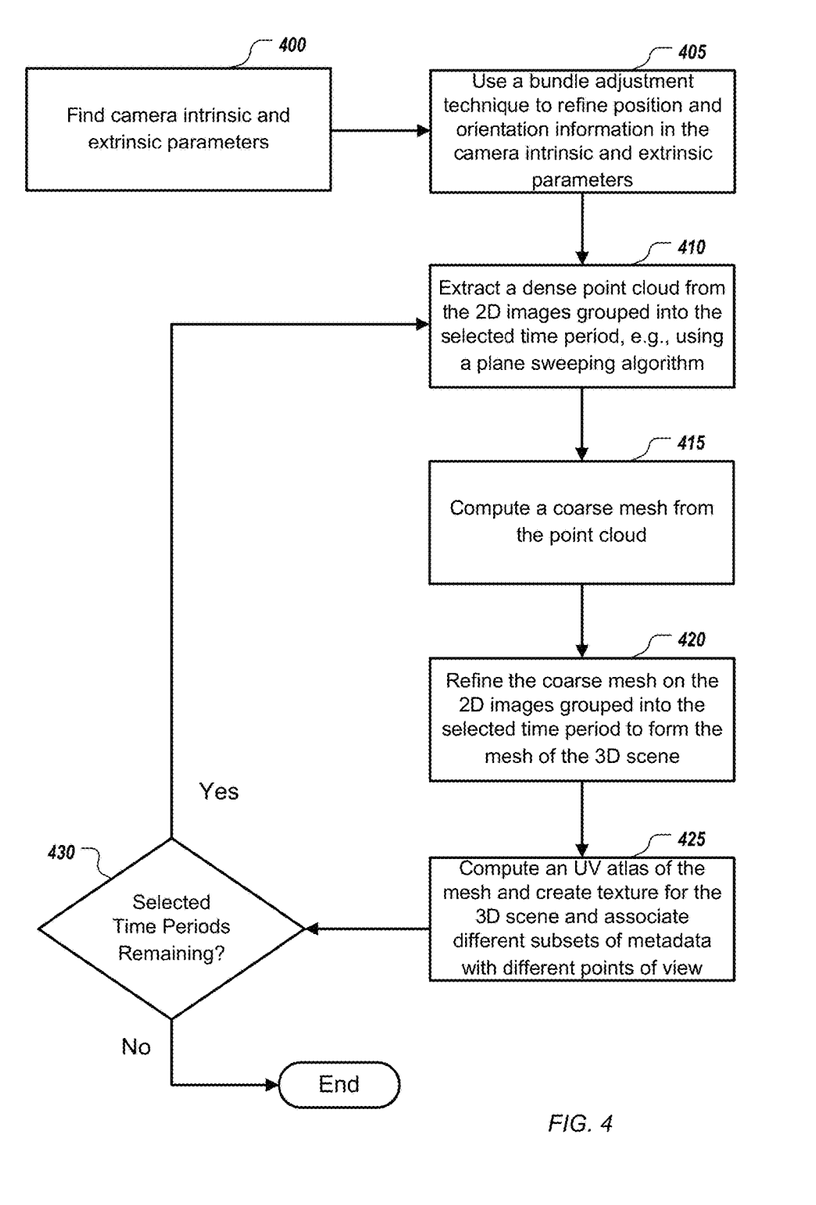
FIG. 4 shows an example of a process of reconstructing a 3D scene from 2D images.

FIG. 4 shows an example of a process of reconstructing a 3D scene from 2D images. Camera intrinsic and extrinsic parameters can be found 400. For example, some implementations can use the systems and method described in Richard Hartley and Andrew Zisserman (2003), Multiple View Geometry in Computer Vision, Cambridge University Press. pp. 155-157. ISBN 0-521-54051-8). In addition, a bundle adjustment technique can be used 405 to refine position and orientation information in the camera intrinsic and extrinsic parameters. For example, some implementations can use the systems and method described in B. Triggs; P. McLauchlan and R. Hartley and A. Fitzgibbon (1999), "Bundle Adjustment—A Modern Synthesis", ICCV '99: Proceedings of the International Workshop on Vision Algorithms, Springer-Verlag. pp. 298-372. doi: 10.1007/3-540-44480-7_21. ISBN 3-540-67973-1). Furthermore, in implementations that also use 3D images as inputs, aligning can be done by computing a rigid motion between the 3D entities (photogrammetric scene and 3D data) based on a few common 3D points. Thus, registration between 2D and 3D images can be achieved using this or other methods.

A 3D point cloud can be generated 410 from the 2D images grouped into the selected time period. For example, a plane sweeping algorithm can be used to extract a dense point cloud. A coarse mesh can be computed 415 from the 3D point cloud, using known methods, and the coarse mesh can be refined 420 on the 2D images grouped into the selected time period to form the mesh of the 3D scene. Further, an UV atlas of the mesh can be computed 425 and texture created for the 3D scene. As will be appreciated, the UV (denoting axes of the 2D texture) mapping can come from individual images in the set and/or from images that have been stitched or blended in various manners. In addition, in some implementations, different subsets of the metadata for the images (e.g., generated metadata describing a particular feature of a location, such as the West Wing of the White House) can be associated 425 with different points of view in the 3D scene.

A check can then be made 430 to see if there are more selected time periods. While there are, the process continues. Note that in some implementations, all identified time periods are processed before any output is shown to a user. In other implementations, the user can be given access to a generated 3D scene while processing to reconstruct additional 3D scenes from different time periods continues.

Figure 5:
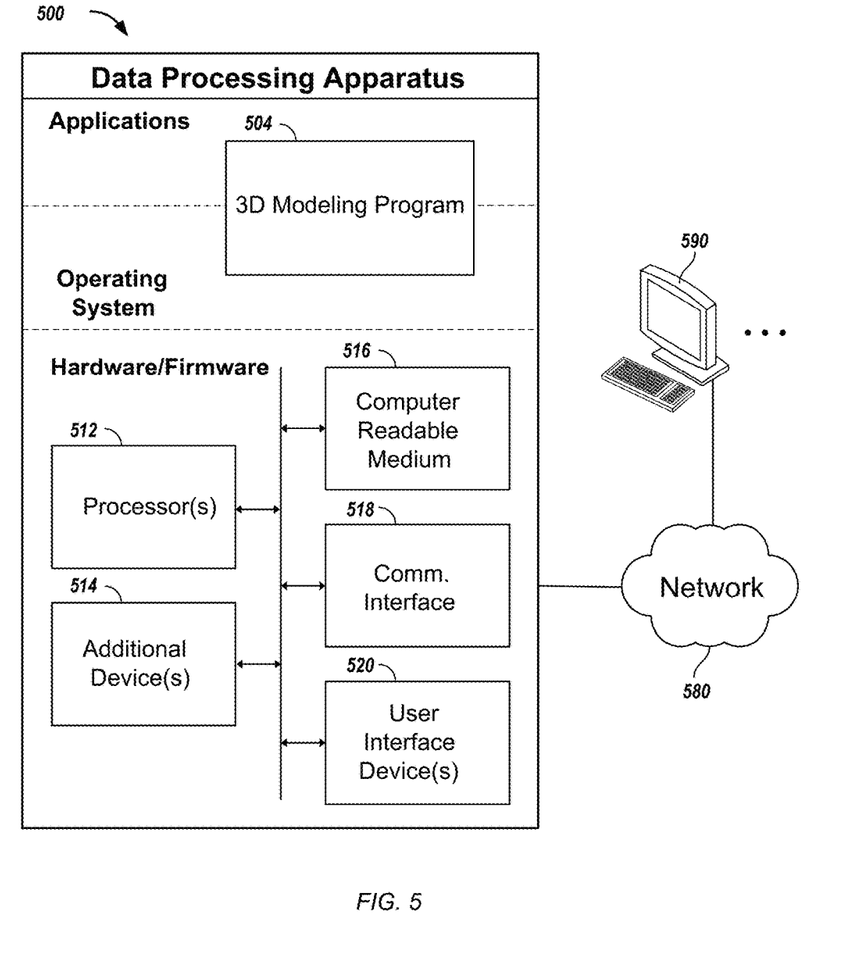
FIG. 5 is a schematic diagram of a data processing system.

FIG. 5 is a schematic diagram of a data processing system including a data processing apparatus 500, which can be programmed as a client or as a server. The data processing apparatus 500 is connected with one or more computers 590 through a network 580. While only one computer is shown in FIG. 5 as the data processing apparatus 500, multiple computers can be used. The data processing apparatus 500 includes various software modules, which can be distributed between an applications layer and an operating system. These can include executable and/or interpretable software programs or libraries, including tools and services of a 3D modeling program 504. The 3D modeling program 504 can implement the systems and techniques described above and variations thereof. For example, in some implementations, the 3D modeling program 504 can also include other elements in the reconstructed and rendered scenes, such as people or animal life (e.g., ancient native American tribes, dinosaurs, etc.) that match the appropriate timeframe, or output to a heads-up display (e.g., pop-ups for obtaining information interactively) that describes metadata supporting the images and models in the timeframe (e.g., narrative data meant to enhance the experience by offering coach marks, pointers, etc.). Regardless, of the operational details of the 3D modeling program 504, the number of software modules used can vary from one implementation to another. Moreover, the software modules can be distributed on one or more data processing apparatus connected by one or more computer networks or other suitable communication networks.

The data processing apparatus 500 also includes hardware or firmware devices including one or more processors 512, one or more additional devices 514, a computer readable medium 516, a communication interface 518, and one or more user interface devices 520. Each processor 512 is capable of processing instructions for execution within the data processing apparatus 500. In some implementations, the processor 512 is a single or multi-threaded processor. Each processor 512 is capable of processing instructions stored on the computer readable medium 516 or on a storage device such as one of the additional devices 514. The data processing apparatus 500 uses its communication interface 518 to communicate with one or more computers 590, for example, over a network 580. Examples of user interface devices 520 include a display, a camera, a speaker, a microphone, a tactile feedback device, a keyboard, and a mouse. The data processing apparatus 500 can store instructions that implement operations as described above, for example, on the computer readable medium 516 or one or more additional devices 514, for example, one or more of a floppy disk device, a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. A method comprising:
obtaining metadata for two dimensional (2D) images from different sources, wherein the images are related to a location of interest;
searching for discrete image correspondences between pairs of the 2D images;
grouping the 2D images into different time periods, wherein the grouping comprises inferring one or more time periods for a portion of the 2D images that do not have date metadata based on a number of discrete image correspondences found between the portion of the 2D images that do not have date metadata and one or more of the 2D images that do have date metadata;
receiving a selection of at least one of the different time periods;
finding camera intrinsic and extrinsic parameters for each image grouped into the selected time period;
reconstructing a three dimensional (3D) scene of the location of interest during the selected time period from the 2D images grouped into the selected time period using the camera intrinsic and extrinsic parameters; and
providing the 3D scene for use in displaying, on one or more computer output devices, the location of interest from different 3D perspectives.

2. The method of claim 1, comprising using a bundle adjustment technique to refine position and orientation information in the camera intrinsic and extrinsic parameters.

3. The method of claim 1, comprising identifying incorrect date metadata for at least one of the images based on a lack of discrete image correspondences found between the at least one of the images and other ones of the images that have date metadata.

4. The method of claim 1, wherein the reconstructing comprises:
extracting a dense point cloud, from the 2D images grouped into the selected time period, using a plane sweeping algorithm;
computing a coarse mesh from the point cloud;
refining the coarse mesh on the 2D images grouped into the selected time period to form the mesh of the 3D scene; and
computing an UV atlas of the mesh and creating texture for the 3D scene.

5. The method of claim 1, comprising retrieving the 2D images from the different sources comprising one or more servers hosting scanned print references, video feeds, social media sites, and one or more users, and wherein the obtaining comprises extracting metadata from at least a portion of the retrieved 2D images.

6. The method of claim 1, comprising associating different subsets of the metadata with different points of view in the 3D scene.

7. The method of claim 1, wherein receiving the selection comprises receiving selection of two or more of the different time periods, the finding and the reconstructing are performed for each of the two or more of the different time periods, and the providing comprises providing two or more 3D scenes of the location of interest at two or more different times, wherein the two or more 3D scenes support animation of the location of interest on the one or more computer output devices, the animation showing movement in both space and time.

8. The method of claim 1, wherein the searching comprises employing user input regarding one or more common features in the 2D images and one or more regions in the 2D images that have changed over time.

9. The method of claim 1, wherein the searching comprises:
finding at least two sets of the 2D images that share corresponding sets of discrete image correspondences;
presenting to a user at least one image from each of the at least two sets;
receiving from the user selections of a first region of interest that is common across the presented images and a second region of interest that has changed across the presented images; and
rechecking for discrete image correspondences between pairs of the 2D images using the first region of interest and the second region of interest.

10. The method of claim 9, wherein the grouping comprises separating the 2D images into the different time periods based on a number of discrete image correspondences found in the second region of interest in relation to a number of discrete image correspondences found in the first region of interest.

11. A system comprising:
a computer network; and
one or more computing devices coupled with the computer network and programmed to (i) obtain metadata for two dimensional (2D) images from different sources in the computer network, wherein the images are related to a location of interest, (ii) search for discrete image correspondences between pairs of the 2D images, (iii) group the 2D images into different time periods, including inferring one or more time periods for a portion of the 2D images that do not have date metadata based on a number of discrete image correspondences found between the portion of the 2D images that do not have date metadata and one or more of the 2D images that do have date metadata, (iv) receive a selection of at least one of the different time periods, (v) find camera intrinsic and extrinsic parameters for each image grouped into the selected time period, (vi) reconstruct a three dimensional (3D) scene of the location of interest during the selected time period from the 2D images grouped into the selected time period using the camera intrinsic and extrinsic parameters, and (vii) display the location of interest from different 3D perspectives in the 3D scene.

12. The system of claim 11, wherein the one or more computing devices are programmed to use a bundle adjustment technique to refine position and orientation information in the camera intrinsic and extrinsic parameters.

13. The system of claim 11, wherein the one or more computing devices are programmed to identify incorrect date metadata for at least one of the images based on a lack of discrete image correspondences found between the at least one of the images and other ones of the images that have date metadata.

14. The system of claim 11, wherein the one or more computing devices are programmed to extract a dense point cloud using a plane sweeping algorithm, compute a coarse mesh from the point cloud, refine the coarse mesh on the 2D images grouped into the selected time period to form the mesh of the 3D scene, and compute an UV atlas of the mesh and create texture for the 3D scene.

15. The system of claim 11, wherein the one or more computing devices are programmed to retrieve the 2D images from the different sources comprising one or more servers hosting scanned print references, video feeds, social media sites, and one or more users, and the one or more computing devices are programmed to extract metadata from at least a portion of the retrieved 2D images.

16. The system of claim 11, wherein the one or more computing devices are programmed to associate different subsets of the metadata with different points of view in the 3D scene.

17. The system of claim 11, wherein the one or more computing devices are programmed to reconstruct a 3D scene for each of two or more selected time periods, and animate of the location of interest in both space and time using the reconstructed 3D scenes.

18. The system of claim 11, wherein the one or more computing devices are programmed to employ user input regarding one or more common features in the 2D images and one or more regions in the 2D images that have changed over time.

19. The system of claim 11, wherein the one or more computing devices are programmed to find at least two sets of the 2D images that share corresponding sets of discrete image correspondences, present to a user at least one image from each of the at least two sets, receive from the user selections of a first region of interest that is common across the presented images and a second region of interest that has changed across the presented images, and recheck for discrete image correspondences between pairs of the 2D images using the first region of interest and the second region of interest.

20. The system of claim 19, wherein the one or more computing devices are programmed to separate the 2D images into the different time periods based on a number of discrete image correspondences found in the second region of interest in relation to a number of discrete image correspondences found in the first region of interest.

* * * * *